Figure 1:
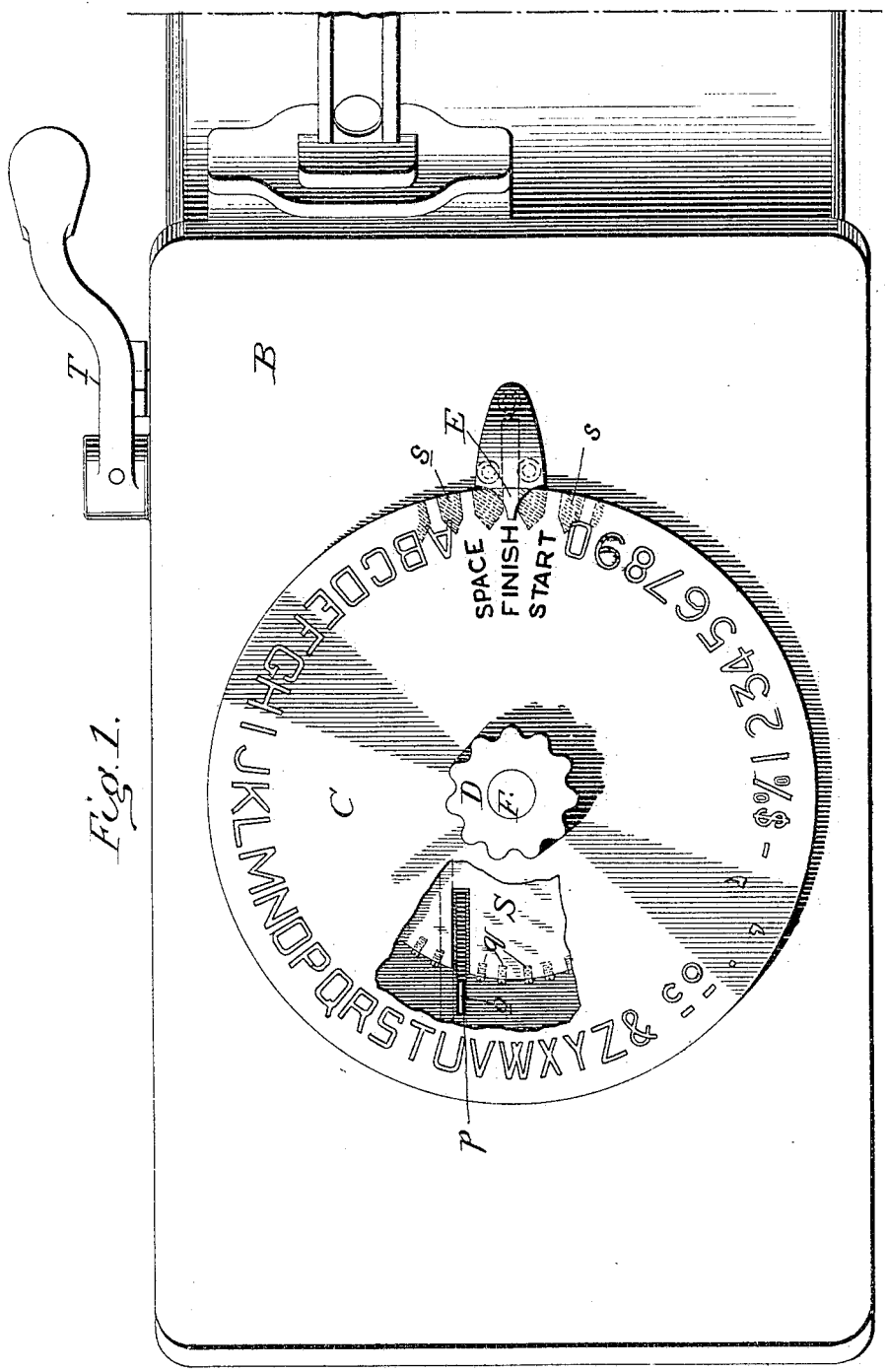

No. 775,354. PATENTED NOV. 22, 1904.
A. W. & A. H. ROOVERS.
DIE PRESS.
APPLICATION FILED FEB. 11, 1903.
NO MODEL. 7 SHEETS—SHEET 1.

Witnesses
Inventors:
Alfred W. Roovers,
Alexander H. Roovers,
by Dodge Sons,
Attorneys.

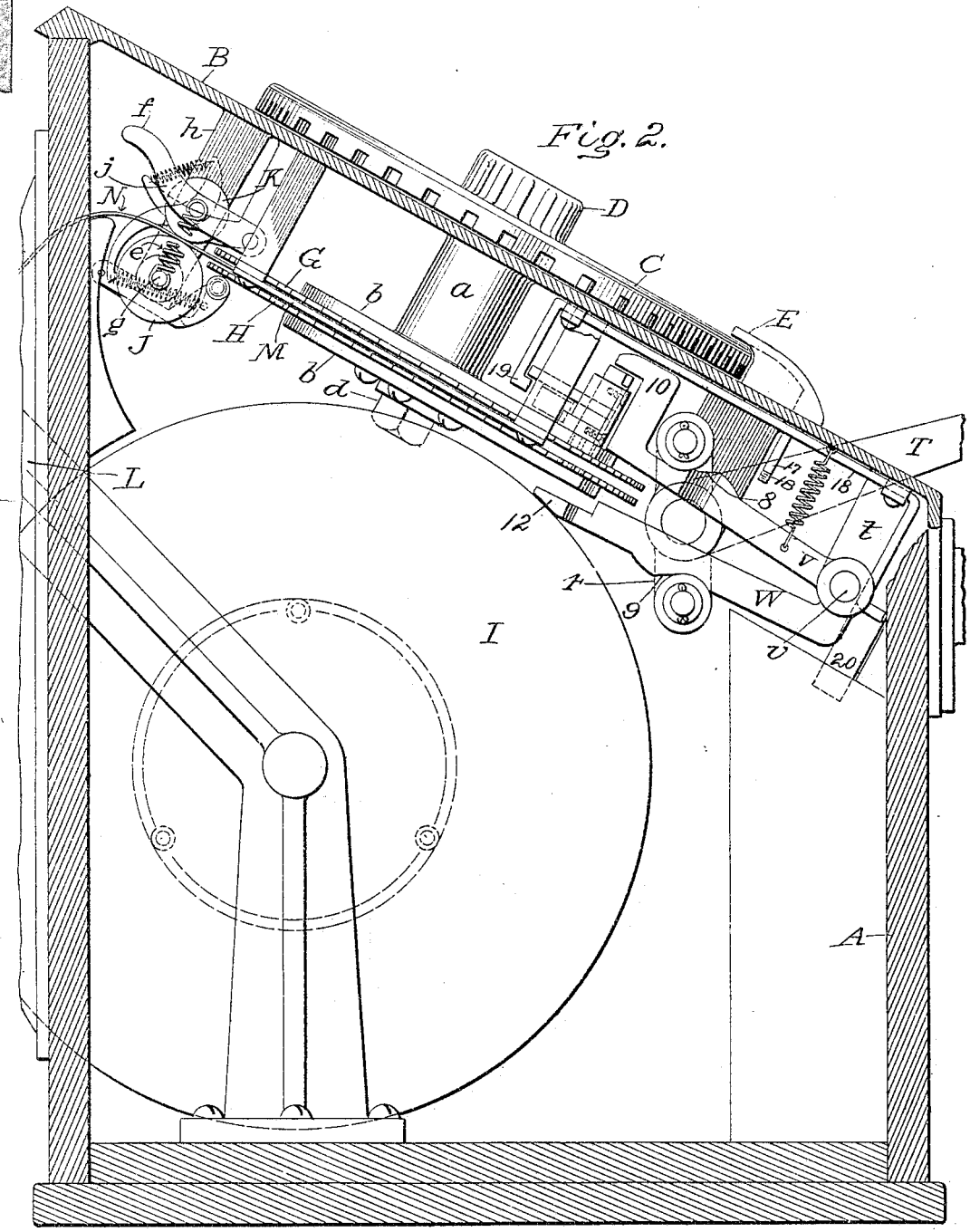

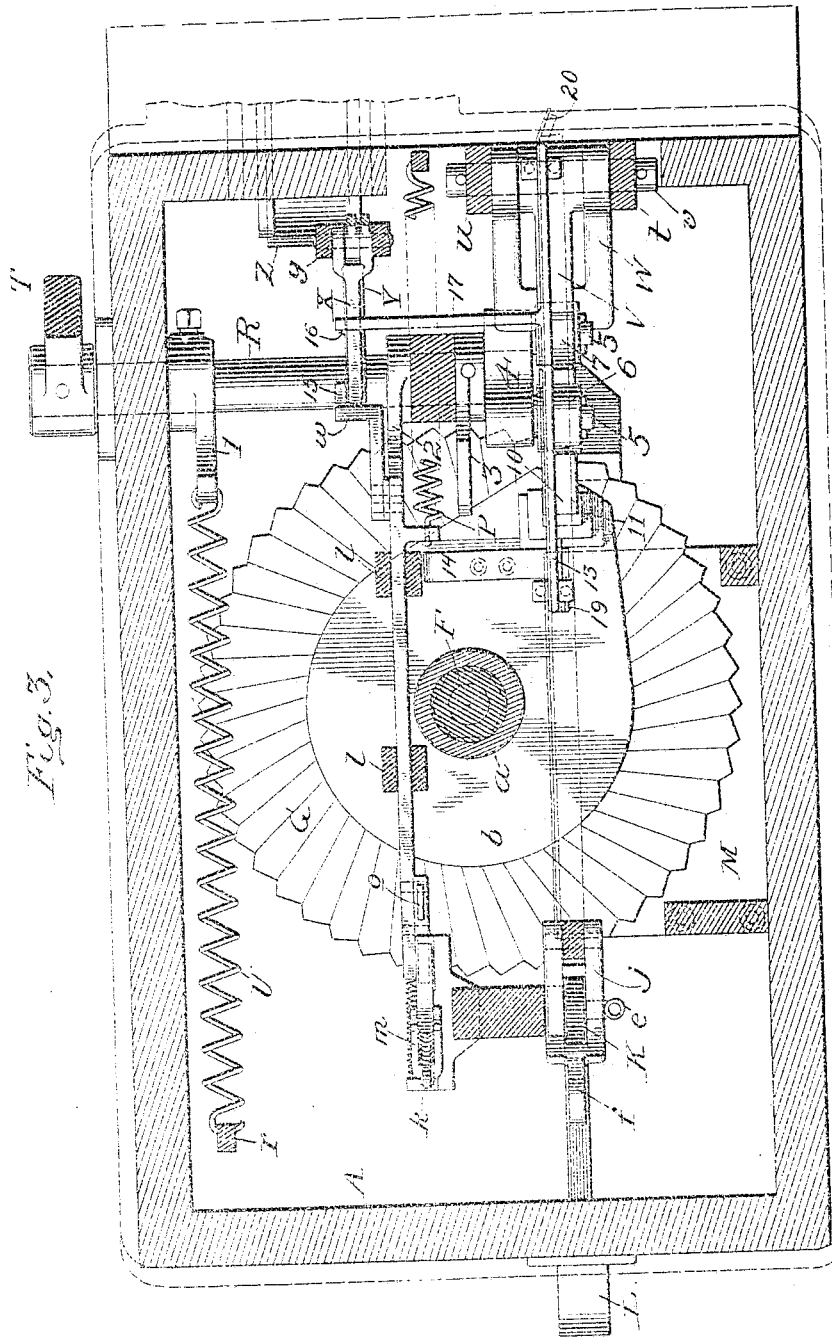

No. 775,354. PATENTED NOV. 22, 1904.
A. W. & A. H. ROOVERS.
DIE PRESS.
APPLICATION FILED FEB. 11, 1903.
NO MODEL. 7 SHEETS—SHEET 4.
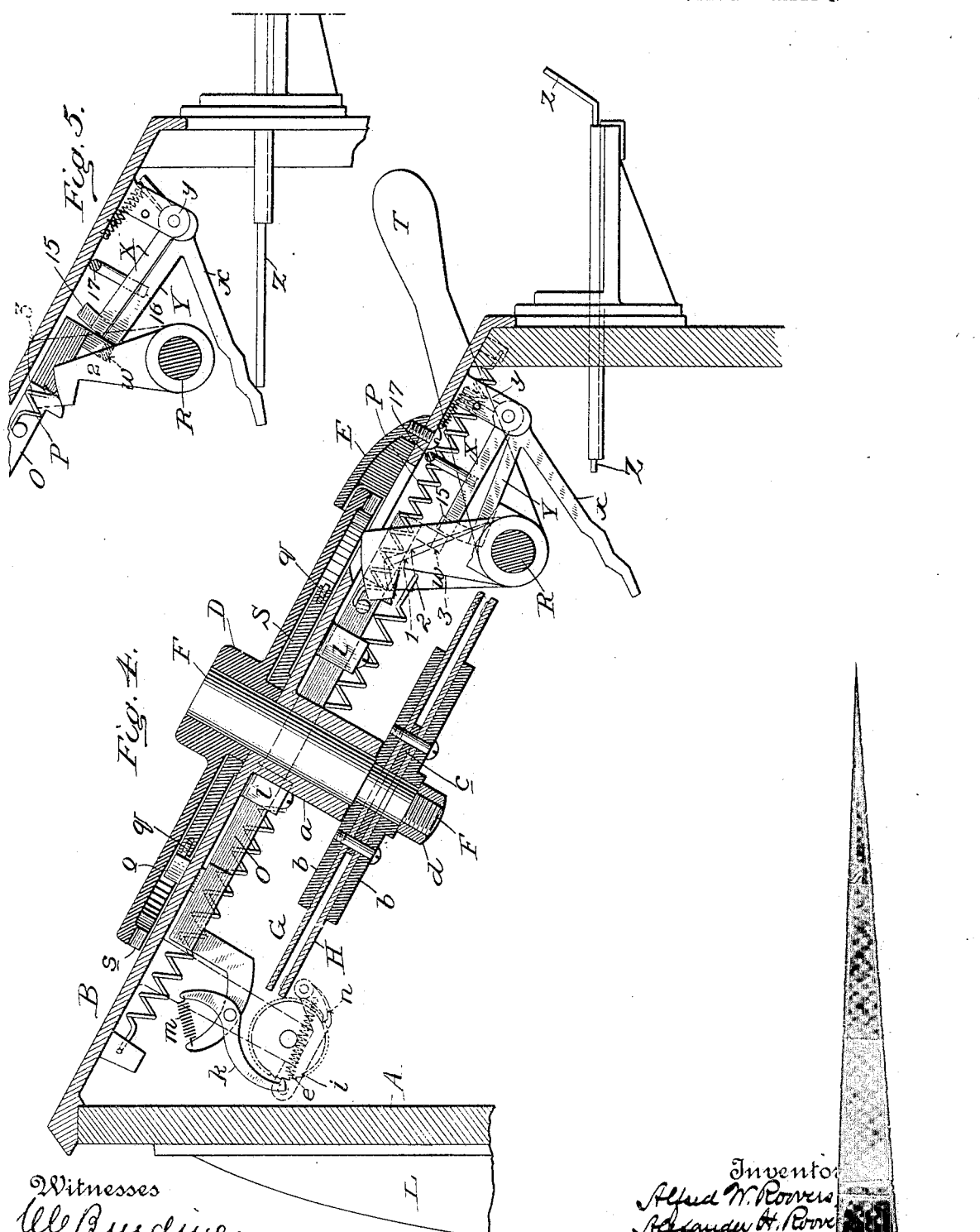

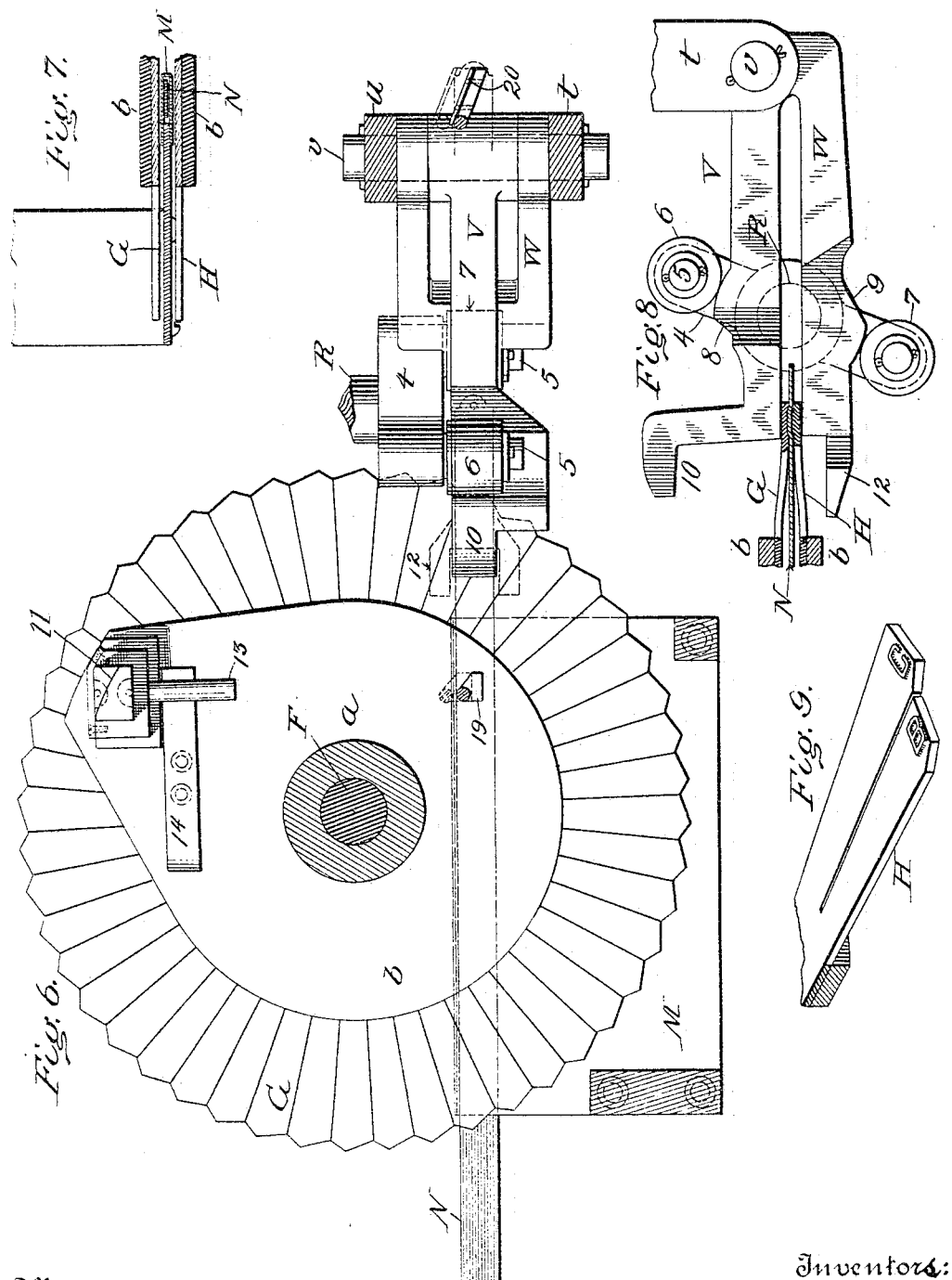

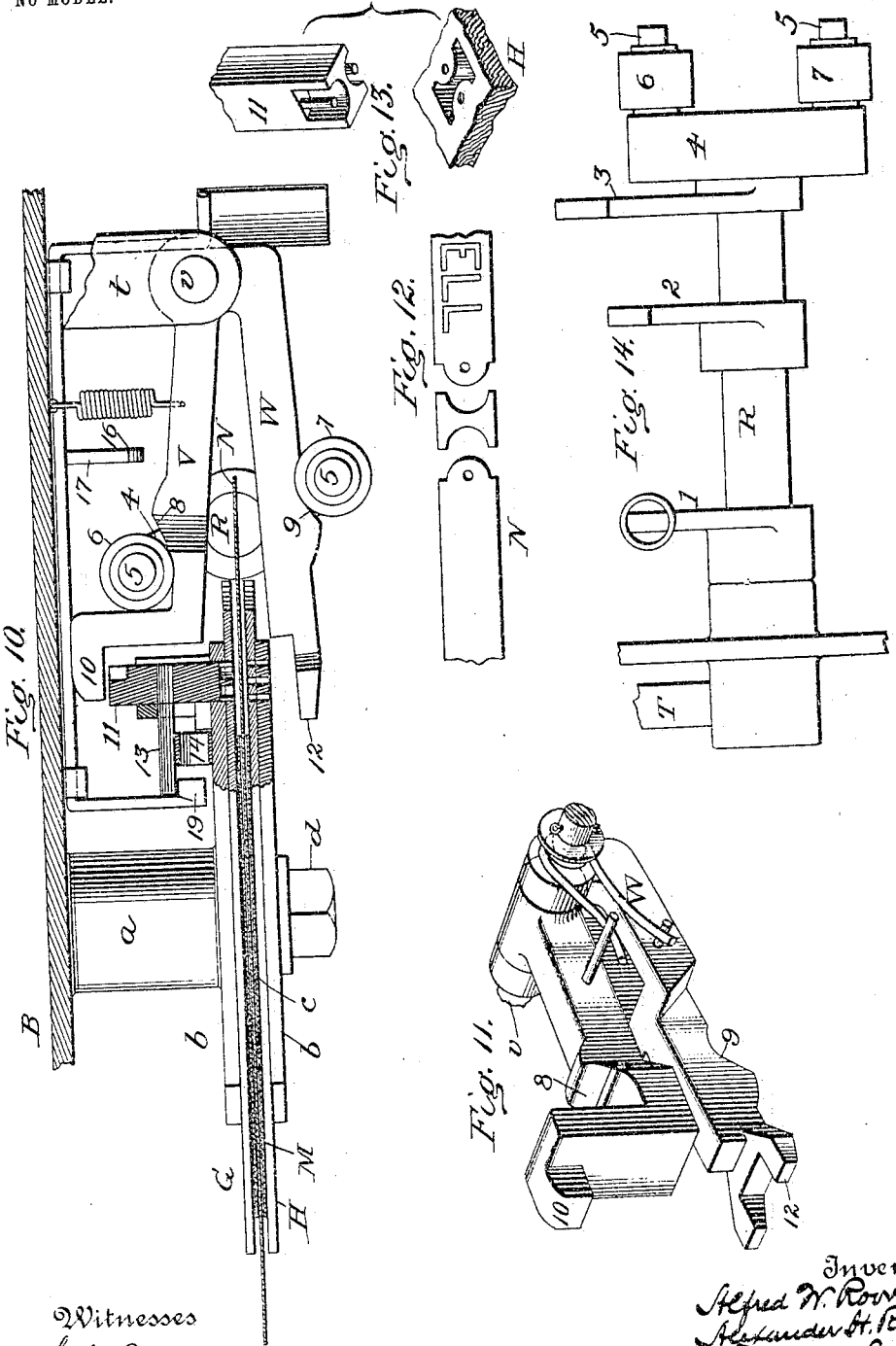

No. 775,354. PATENTED NOV. 22, 1904.
A. W. & A. H. ROOVERS.
DIE PRESS.
APPLICATION FILED FEB. 11, 1903.
NO MODEL. 7 SHEETS—SHEET 7.
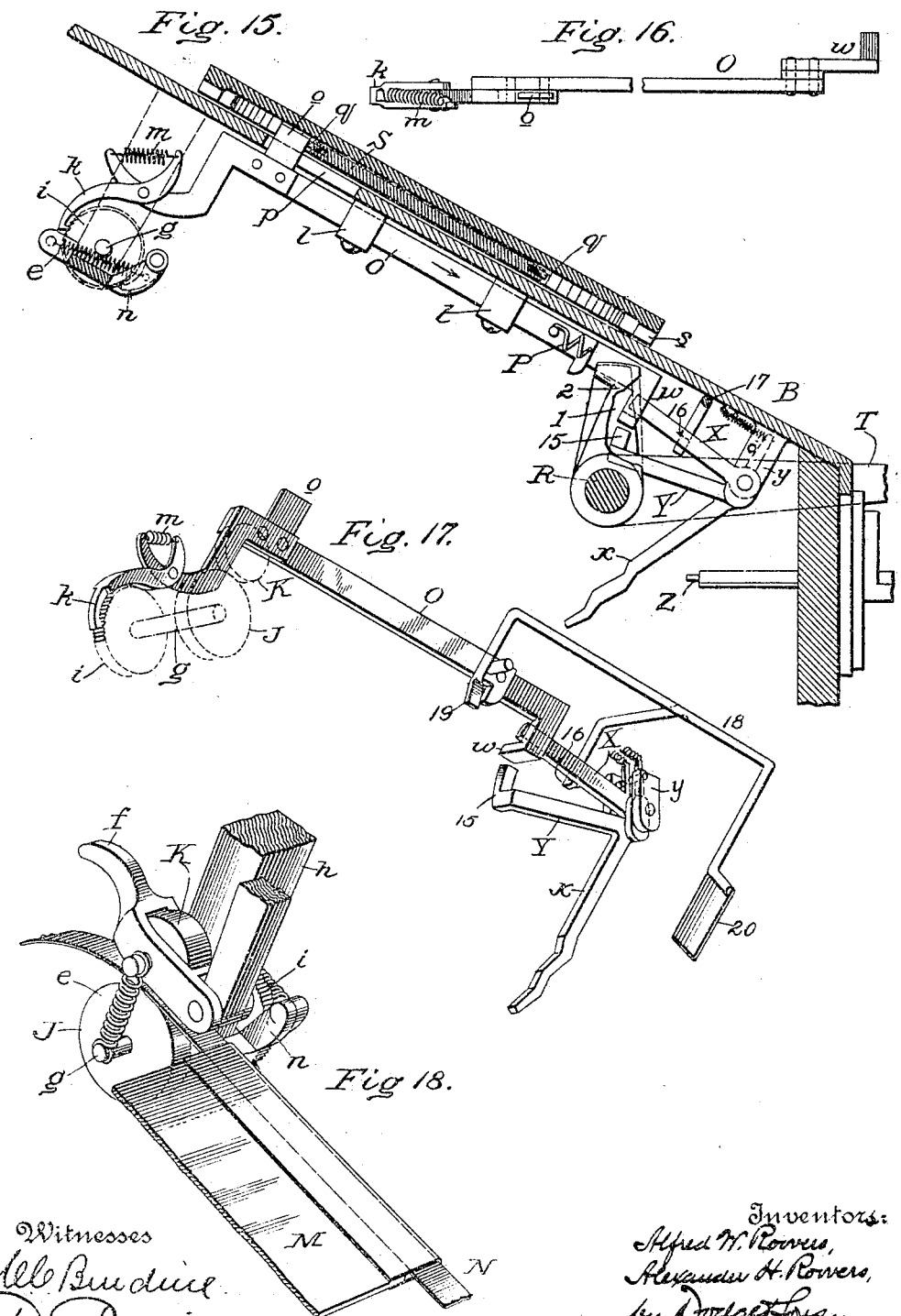

No. 775,354. Patented November 22, 1904.

UNITED STATES PATENT OFFICE.

ALFRED W. ROOVERS AND ALEXANDER H. ROOVERS, OF BROOKLYN, NEW YORK.

DIE-PRESS.

SPECIFICATION forming part of Letters Patent No. 775,354, dated November 22, 1904.

Application filed February 11, 1903. Serial No. 142,953. (No model.)

*To all whom it may concern:*

Be it known that we, ALFRED W. ROOVERS and ALEXANDER H. ROOVERS, citizens of the United States, residing at Brooklyn, in the county of Kings and State of New York, have invented certain new and useful Improvements in Die-Presses, of which the following is a specification.

This invention relates to that class of die-presses designed to produce raised or embossed letters or characters in a thin strip of material, preferably metal, which machines are now commonly known to the public as "name-plate" machines. In their more usual form they are provided with means for receiving and safely depositing a coin, such depositing of the coin being a prerequisite to the operation of the machine.

The present invention does not pertain to the coin actuated or controlled locking and releasing devices, which, however, are shown and will be very briefly described for the purpose only of giving a clear understanding of the entire machine in its preferred form.

The machine about to be described is in the nature of an improvement upon or a modification of one for which Letters Patent of the United States were granted to us, bearing date the 19th day of November, 1901, and numbered 687,167 and 687,168, though constituting a distinct machine, complete in itself, without reference to anything contained in said prior patents.

The invention is illustrated in the accompanying drawings, in which—

Figure 1 is a top plan view with a portion of the dial-plate broken away to show parts beneath; Fig. 2, a side elevation of the machine with the box or casing in section; Fig. 3, a section taken immediately beneath and in a plane parallel with the top plate of the machine or of its casing; Fig. 4, a sectional view through the mechanism from front to rear through the middle of the machine, except that the central spindle is shown in full lines; Fig. 5, a view illustrating the locking mechanism and the action of the coin-slide; Fig. 6, a top plan view of the upper die-plate and certain of the associated parts; Fig. 7, a transverse section through the strip-guide and through a portion of the die-plates; Fig. 8, a side elevation of the mechanism by which the die-plates are forced together to emboss the letter or character in or upon the strip; Fig. 9, a perspective view of a section of the lower die-plate in one of its proposed forms; Fig. 10, a side elevation of the mechanism for actuating the cut-off or finishing dies, which dies are shown in section; Fig. 11, a perspective view of the compressing-jaws by which the embossing and the cutting-off dies are actuated; Fig. 12, a plan or lower face view of the severed ends of the strip and of the piece removed by the cut-off die; Fig. 13, a perspective view of the male and female finishing-dies; Fig. 14, an elevation of the main rock-shaft with its several radial arms or levers by which various parts are actuated; Fig. 15, a sectional view through the top plate and a portion of the dial, showing particularly the feed mechanism by which the letter-spacing is effected; Fig. 16, a top plan view of the spacing-bar and dog; Fig. 17, a perspective view of said parts, together with the stop or lock-out mechanism; and Fig. 18 a perspective view of the feed-rolls and detent therefor, showing also the strip-guide.

The finest results are attainable, as we believe, by making each die in or upon a separate stem or block, admitting of perfect formation, tempering, and adjustment separately; but good commercial results are possible without resorting to such comparatively expensive construction.

The present invention is directed to producing a cheaper machine, but one which shall nevertheless be capable of doing work of good quality and which shall remain in proper adjustment and working condition even when subjected to the rough handling which machines receive when operated by the public indiscriminately. With these and other objects in view the preferred embodiment of our invention is that illustrated in the accompanying drawings, which we will now describe.

As the machine is primarily designed to be stationed in public places and used by the general public in consideration of a coin or token in each case deposited as a condition precedent to operation, a suitable closed casing or cabinet A is provided, the top of which is formed by a metal plate or casting B, preferably set at an angle to facilitate the reading of the characters on the dial-plate C, which is centrally located upon or above the plate B, and also to cause rain or moisture falling upon the machine to run off freely and promptly. A further purpose of such inclination is to insure proper delivery of the name-plate or strip produced. A raised annular rib just within the skirt of the dial-plate aids in excluding moisture from the mechanism below the top plate, as in the prior construction above referred to.

*Dial-plate.*—The dial-plate C is provided with a knob D or other convenient means of turning it and has the characters which the machine is capable of producing indicated in any convenient manner upon its upper face, as shown in Fig. 1, preferably by casting them in raised form upon said face. It is further provided with indications of the starting, finishing, and spacing positions, preferably consisting of the words "Start," "Finish," and "Space," each of which is brought at the required time opposite a pointer or indicator E, secured to the top plate B and having a tongue or pointer overhanging the edge of the plate or dial C, as seen in Figs. 1 and 2. This indicator or pointer serves also for the positioning of the characters to be produced, the bringing of any given character on the dial to its position directly opposite the pointer serving to bring the corresponding die to the impressing or embossing point in the machine.

The dial-plate C is carried by a central spindle or axle F, passing through the central hub or boss of the dial and suitably secured therein, the lower end of said hub or boss resting upon the top plate B of the machine, as shown in Fig. 4. To give proper support and steadiness to the spindle F, the top plate B is formed with a hub or boss *a*, Figs. 2 and 4, extending a suitable distance below the plate B.

*Die-plates.*—The lower end of spindle F, which is represented in Fig. 4 as necked down or shouldered, but which may be left of full diameter, if desired, carries the die-plates G and H, each of which is advisably provided with a backing plate or disk *b*, the die-plates being separated a suitable distance by a washer *c* or in other convenient manner. A nut *d*, applied to the threaded extremity of the spindle F, serves to hold the die-plates (which with their backing-plates and separating-washer may be rigidly fastened together by screws or other convenient fastenings) to the spindle.

The die-plates G and H are substantially circular disks, preferably of steel, but of other metal or material, if desired, having in their opposing faces and at uniform distance from the axis of spindle F male and female dies corresponding to the characters which the machine is designed to produce. In the drawings the upper die-plate G is represented as having the dies in intaglio or sunken into its lower face, while the dies of the lower plate H are in relief and designed to register with and enter into the similarly-formed but sunken dies above them.

It is our purpose to make the die-plates of material of sufficient resilience to permit them to be forced toward each other at the periphery closely enough to bring their bodies or faces into contact with opposite faces of the interposed strip, or practically so, and sufficiently in any event to effect a proper embossing of the characters in or upon said interposed strip. As the requisite movement is very slight, this may be accomplished with solid plates of moderate thickness; but if greater flexibility be desired or a relatively heavy die-plate be deemed advisable the plates may be slitted radially, as in Fig. 6, or on lines tangential to a circle concentric with but smaller than the die-plates, as indicated in Fig. 3, thus rendering each letter-bearing portion of the die-plates capable of ready flexion.

As an alternative construction the plates may be rigid, and the washer *c*, which separates them, be made elastic, thus enabling said plates to be bodily moved toward and from each other, instead of being bent or sprung.

*Strip-guiding mechanism.*—The strip to be operated upon is wound upon a reel or drum I, suitably mounted in the cabinet or casing A, and passes thence to feed-rolls J and K.

In Figs. 2, 3, and 4 of the drawings there is represented a metal cap or casting L, secured to the casing and forming a channel or passage through which the strip may pass to the outside of and return to the interior of the casing or cabinet A, a guide-block being advisably located at the point of return, as shown in Fig. 2, to bring the strip properly to the feed-rolls J K.

Directly in advance of the feed-rolls is a guide M. (Shown in Figs. 2, 6, 7, 10, and 18.) This guide consists of a metal plate secured to lugs or studs projecting downwardly from the under side of the top plate B and having at its inner edge and between the die-plates G and H a folded metal strip the edges of which are soldered, riveted, or otherwise made fast to the supporting metal plate, leaving an interior passage or opening of sufficient size to permit the free passage of the strip N through it without sufficient play, however, to interfere with the accuracy of guidance.

*Feeding mechanism.*—The feed or advance of the strip is effected by means of the feed-rolls J K, the latter of which is carried in a swinging frame or yoke *j*, Figs. 2, 3, and 18, drawn by a spring *e* toward the roller J and tending to press the surfaces of the two rollers into contact with each other or with the upper and lower faces of the strip N, which passes between them. The rollers may be of any suitable material to take a proper hold on the strip and insure its advance, and either or both may be milled or roughened, if deemed advisable.

The yoke or swinging frame j is formed with a thumb-piece or extension f, by which to lift its free end in order to separate the rollers when introducing a fresh strip between them. To impart proper motion to the rollers the lower one, J, is secured to a shaft or axle g, which passes through or is journaled in a standard or lug h, projecting downward from the under side of top plate B, and said shaft or axle g carries a ratchet-wheel i, which is engaged by a feed dog or pawl k.

The feed-dog k is pivotally supported upon the rear arm or extension of a feed-slide O, which moves in or through guides l, formed upon or secured to the lower side of top plate B, as seen in Figs. 3, 4, and 15. A spring m connects an upwardly-projecting tail or end of the dog k with a similar extension of the supporting-arm to which the dog is pivoted and tends to hold the toothed or hooked end of the dog in working engagement with the teeth of the ratchet-wheel i, as indicated in Figs. 15 and 17. Under this arrangement it will be seen forward movement of the slide O will effect a partial rotation of wheel i, and consequently of its shaft or axle g and of feed-roll J, causing a proportionate advance of the strip N. A backward movement of the slide causes the dog k to ride backward over the long or outer faces of the ratchet-teeth and to engage another tooth preparatory to a second advance, the ratchet-wheel being held against backward rotation by a dog or detent n, pivoted to a suitable support and yieldingly held by gravity or spring-pressure against the teeth of the ratchet-wheel and in engagement therewith.

In practice we prefer to employ a spring-pressed pawl for this purpose, as indicated in Figs. 2, 4, 15, and 18, the latter showing the dog and spring in full lines, and the others showing said parts wholly or partially in dotted lines.

The sliding feed-bar O is normally drawn forward by means of a spiral spring P, Figs. 3, 4, 5, and 15, one end of which is attached to a lateral stud or projection of the bar O, and the other end of which is made fast to a lug on the under side of the top plate B, as indicated in Fig. 4, or to other rigid support. The backward movement of the feed-bar is effected by an arm 2, carried by the main rock-shaft R, hereinafter referred to, said arm serving also to prevent the forward movement of the bar except at the proper times.

*Spacing mechanism.*—It is necessary or at least desirable to vary the feed of the strip according to the width of the letter or character produced or to be produced, so that the spacing between letters in a word may be uniform, and it is further desirable to provide for additional spacing between words and between certain characters or groups of characters, as also to give a proper length of strip at each end and after the commencement of the characters. To this end there is applied to the spindle F, preferably directly below the dial-plate, a space-regulating disk S, having stops to engage an upwardly-extending lug or projection o, formed upon or carried by the feed-bar O, as seen in Figs. 1, 3, 4, 15, and 17.

In order to permit an extended movement of the bar and a consequently extended feed of the strip when starting a new or finishing an old strip, a deep cut is made in the space-regulating disk to admit the projection o at such time as such feed is needed. The starting and finishing points being close together, it is possible to make the opening of such dimensions as to answer for both; but this is optional, as any suitable number or recesses may be made, as required. In Fig. 1 one such opening p is shown. The same figure shows a series of adjustable stop-pins q, here in the form of screws, which may be made to project more or less beyond the periphery of the disk S, and thus to arrest the stop or projection o at the proper points in the movement of the feed-bar. Any form of adjustable stop may be used, and where greater movement of the feed-slide than is permitted by the periphery of the disk S is required depressions may be made of any suitable depth.

*Actuating mechanism.*—Mention has been made above of an actuating rock-shaft R. This shaft is shown in various figures of the drawings; but its position and relation to other parts is perhaps best indicated in Figs. 3 and 4, while Fig. 14 shows the shaft and the arms carried by it separate and distinct from other parts. Referring to these figures, it will be seen that the rock-shaft is suitably journaled in the cabinet or casing or in a plate secured thereto and in a bracket-arm or post projecting downward from the under side of the top plate B, this post being best seen in Figs. 2 and 3. At its outer end and outside of the casing or cabinet rock-shaft R is provided with a hand-lever T, through which to rock or turn it. Within the cabinet or casing said rock-shaft is provided with three radial arms 1, 2, and 3 and with a double arm or cross-head 4, having laterally-projecting studs 5, preferably furnished with rollers 6 and 7. The first of these radial arms 1 projects upward above the shaft and has attached to it one end of a coiled or spiral spring U, the other end of which is attached to a lug r.

The office of spring U is to rock the shaft to the position indicated in Figs. 2, 3, and 4, causing lever T to be elevated to a convenient position for manipulation. The spring serves to hold the lever, its rock-shaft, and the parts carried by said shaft normally in the positions indicated.

The second arm 2 is in the nature of a cam and serves to force back and normally to hold back the feed-slide O, the outer end of said arm being curved on the arc of a circle concentric with the axis of the rock-shaft R, in consequence of which the slide is held at rest or is prevented from moving forward so long as the peripheral or end portion of said arm 2 is in contact with the forward end of the slide, as it is during a part of the movement of the lever.

The third arm 3, which is beveled or V-shaped on its outer edge, stands directly in line with the pointer or indicator E and swings into the hollow or open space beneath it as the lever T is depressed. In so doing it enters between lugs s, formed on the under side of the dial-plate C, as indicated by dotted lines in Fig. 1 and shown in full lines in Figs. 2, 4, and 15. These lugs are V-shaped on the faces toward the center of the dial, so that if the dial be not turned exactly to position the arm 3, entering the V-shaped space between proximate lugs and bearing upon one or the other oblique face presented to it, will bring the plate exactly to position and moving then into the narrow parallel walled opening will serve to lock the dial-plate and the parts carried by it firmly and exactly in position. The beveling of the outer end of arm 3 precludes its locking against the V-shaped edges of the lugs s and facilitates its entrance between them.

The cross-head or double arm 4 serves to act upon the clamping or pressing devices by which the two disks or the die-carrying portions of the two disks are forced together. That mechanism will now be described.

*Die-pressing devices.*—Extending downward from the under side of top plate B are two brackets or posts t and u, through which extends an axle or rod v, as seen in Figs. 2, 3, 4, 5, 6, 8, and 11. Upon the axle or rod v are hung or pivoted two jaws or levers V and W, the form of which is best shown in Figs. 10 and 11. These levers extend between the rollers 6 and 7, which are designed to act upon cam-faces 8 and 9, formed upon the levers, the shape being such that as the hand-lever T is depressed and the cross-head or double arm 4 assumes a substantially vertical position the levers V and W shall be pressed together and engaging between them the die-plates G and H or die-carrying portions of each force them together.

The lever V is provided with an overhanging outer end 10 to act upon the cut-off die 11 when said die is brought to a position beneath it, and the lever W has an extension 12, preferably of forked form, as seen in Fig. 11, to bear beneath and support the die-plate and its carrying-disk at the point where the cut-off die is located. This provision is made in order that the pressure required to force the cutting-die through the strip may not unduly strain the die-plates or their supporting parts.

As seen in Figs. 3 and 6, only that portion of the backing-plate or support b of the upper die-plate which carries the cut-off die is extended out far enough to come between the projecting ends 10 and 12 of the levers V and W, and, as indicated in Fig. 10, the same is true of the backing-plate of the lower die-plate, which, in fact, is the same in form as the backing of the upper die-plate.

The action of the levers V and W will be readily understood upon referring to Fig. 8, where the cross-head or double arm 4 is shown swung to its extreme position, or nearly so, in the operating direction. It will be observed upon referring to said figure in connection with Fig. 10 that the pressing or forcing together of the levers is effected by the travel of the rollers over the cam-faces 8 and 9 and that after passing these faces the rollers come to and bear upon portions of the levers which are when the levers are forced together concentric with the axis of rock-shaft R, as seen in Fig. 8. This permits a movement of the lever T beyond the point at which the levers are forced their maximum distance in a direction of approach and gives a slight dwell of the dies upon the interposed strip, which is deemed desirable, especially if substance of any material resilience be operated upon.

It is desirable to give a comparatively quick action in the initial approach of the jaws and preliminary pressing and then a more powerful and gradual pressing. The cam-faces are fashioned to produce this effect, and the portions of the jaws over which the rollers 6 and 7 travel are at first of comparatively quick inclination or curvature—that is to say, are considerably eccentric to the path of travel of the rollers—and then become at first nearly and later perfectly concentric therewith. The form, however, is variable at will.

The jaws or levers V and W will preferably be forced apart and held open by a spring or springs, one convenient form of spring being illustrated in Fig. 11. In Figs. 2 and 10 the lower jaw is shown without a spring and falling by gravity, while the upper jaw is raised by a spiral spring extending from it to the top plate. It is deemed advisable to employ the construction shown in Fig. 11, so that the machine will not be rendered inoperative by being tipped over or put in an unusual position.

As best seen in Figs. 3, 6, and 11, the lower jaw is bifurcated at its fulcrum end and has its body dropped below the eyes which encircle the rod or axle v. This affords a clear space for the passage of the strip N through or between the jaws and onward to any desired distance in that direction.

*The cut-off and finishing punch or die.*—The punch by which the name-plate is cut from the strip is illustrated in Figs. 12 and 13. It is of substantially I form at its lower or operative end, with two circular punches symmetrically located in the hollow sides, as seen in Fig. 13. The female die is of corresponding form, as shown in the same figure, and the die serves when forced down upon the strip to cut out therefrom an I-shaped piece, leaving the end of the severed strip and the end of the main strip each rounded or otherwise suitably fashioned and perforated to give a finish and provide for the insertion of fastening pins or screws. The form of the piece removed and the shape of the ends of the strips are indicated in Fig. 12. This device *per se* is the same as in the former machine above referred to, but is illustrated for the purpose of making clear the description as a whole.

The die 11 moves in a suitable guide-block secured to or formed upon the backing-plate of the upper die-plate, as seen in Figs. 2, 3, 6, and 10. It is provided with a laterally-projecting pin or stem 13, which overhangs a leaf-spring 14, by which the die is elevated and normally held up. Its upward movement is limited by the upper wall of the slot in the guide-block, through which the pin 13 passes. The lower die is simply formed or set in the lower die-plate H.

*Stop or locking mechanism.*—As above stated, the machine is designed to be coin-controlled—that is to say, to require the insertion and deposit of a coin of given value as a condition precedent to the production of a name plate or strip. It is desirable also that the machine shall be locked whenever a given number of characters has been produced or a given length of strip is fed past the cut-off die. This last feature is desirable in order to prevent the making of a series of name plates or strips without cutting them off in the machine, but subsequently severing them in any convenient way. To prevent this improper manipulation of the machine and lock it again after a plate has been produced or a predetermined length of strip has been fed forward, there is provided the mechanism seen in Figs. 2, 3, 4, 10, 15, and 17, the latter figure showing the construction with especial clearness.

As shown in Figs. 3, 4, 5, 15, 16 and 17, the feed bar or slide O is provided with a forwardly-extending and laterally-offset projection *w*. Directly in line with the offset of this forward projection is a latch X, lying above and resting upon a carrier Y, having a depending arm *x*. The latch X and carrier Y are pivotally supported in a bracket or post *y*, projecting downward from the under side of the top plate B, one lying directly over the other, as best indicated in Figs. 3 and 17, and each is provided with a tail or projection, serving as a point of attachment for a spring and as a stop-arm to arrest or limit the movement of the member. Pins or studs located in the path of said arms or of other part of the latch and carrier serve to limit their movement, as indicated in Figs. 3, 4, 5, 15, and 17. Any other convenient form of stop may of course be employed, and the springs may be omitted, though their use is deemed advisable.

Carrier Y is provided with an offset 15 at its free or swinging end which extends upward by the side of the latch X and above the same or to its upper edge when the carrier bears beneath the latch in the act of lifting it. When, however, the latch is raised, it is caught and held up by a hook or detent 16, formed on the downwardly-extending end of an arm 17, projecting from a rock-shaft 18, hung or journaled in supports on the under side of the top plate B directly in line with and above the path of the strip N. The ends of the rock-shaft 18 are carried downward and are provided, respectively, with inclined bearing faces or plates 19 and 20. The plate 19 occupies the position indicated in Figs. 2, 3, 6, and 10, its inclined face standing directly in the path of the pin 13, projecting from the cut-off die 11. It will be seen that whenever said die is depressed the pin 13 will ride upon said inclined face 19 and swing the rock-shaft about its axis sufficiently to carry the hook 16 of its arm 17 away from the latch X, thus permitting the same to fall, but that except when the shaft is rocked the detent will hold the latch elevated after it is once carried to such elevated position. The inclined plate 20 stands directly in the path of the forward end of the strip being formed, so that when said end of the strip reaches and bears against the inclined face of plate 20 it shall similarly rock the shaft 18 and cause the detent 16 to release the latch X.

It will thus be seen that whether the user of the machine shall depress the cut-off die and sever the strip when a proper length is reached or shall attempt to exceed a predetermined length the latch X will be released.

In its released and lowered position latch X is arrested by a stop-pin in front of a tail or arm and stands directly in front of the offset *w* of the feed-bar. Hence said bar cannot be actuated to advance the strip when the latch is lowered and the machine cannot be operated. The carrier Y serves not only to lift the latch and permit the detent to engage and hold it up, but likewise the further purpose of holding the feed-slide against forward movement while the coin-slide Z is returning to its normal position after the coin has been inserted into the coin-slide and the slide pushed in to deposit the coin or while said slide is returning to its normal position.

Depending arm *x* of the carrier Y is located directly in the path of the coin-slide Z, which may be of any approved construction, but is here represented as simply a flat metal slide working through a suitable guideway and having a definitely-limited range of movement inward and outward. It is in practice provided with an opening which registers with a like opening in the guideway to receive a coin, so that when the slide is pushed inward to its extreme range of movement the coin is carried into and deposited within the cabinet or casing. As the slide Z moves inward it encounters the arm *x* of the carrier Y and swings said carrier upward to the position indicated in Fig. 5, carrying with or before it the latch X until said latch is engaged and held up by the hook 16. The coin-slide being then moved outward, the carrier Y falls by gravity or under stress of its spring, if such be provided, to the position indicated in Figs. 15 and 17, leaving space between the upper extremity of its offset arm 15 and the lower face of latch X sufficient for the horizontal or offset arm *w* of the feed-slide to pass between. The curved face 15 of the arm Y prevents movement of the slide until the carrier Y has fully resumed its normal position. Thus any attempt to hold in the slide and continuously operate the machine will bring the offset 15 into the path of the feed-slide and preclude its actuation.

The foregoing description sets forth the preferred embodiment of our invention. Obviously details may be varied considerably without departing from the spirit and scope of the invention. Thus parts which are here shown and described as separate may be cast as one. Instead of the spring-pressed pawls their well-known equivalents—gravitating pawls—may be employed. Any form of coin-depositing slide capable of actuating the release may be adopted, and in many other ways the construction may be modified without at all departing from the scope of our invention.

The operation of the machine is as follows: A proper coin being deposited in the coin-orifice *z* of the slide Z and said slide being pressed inward, the coin is carried to a point within the shell or casing A, where it drops through the guide into the casing or cabinet, where it is deposited. In its forward movement the inner end of the slide Z encounters the arm *x* of latch-carrier Y and lifts it to the position indicated in Figs. 15 and 17, causing a small lug on its side or its lower edge, as the case may be, to be engaged by the detent 16, carried by the rock-shaft 18. As the coin-slide recedes the carrier Y falls back until the latch and carrier occupy the relative positions shown in Figs. 15 and 17, leaving the feed-slide O free to move forward when the lever is operated and the arm 2 is taken out of its path. The dial-plate C is then turned until the word "Start" is brought opposite the pointer or indicator E, which in turn brings the stop-disk S to proper position to allow a comparatively extended movement of the feed-bar. The lever T is then depressed, rocking shaft R, moving arm 2 out of the path of the feed-slide, and permitting said slide to move forward under the stress or pull of spring P until the stop-arm *o* encounters the end wall of the slot or space made in the disk S. In this way the strip is advanced a suitable distance to form the blank end before the commencement of the letters. The dial is then turned to bring successively opposite the pointer or indicator E the letters composing the first name or word to be produced upon the strip, and as each letter in turn is brought to such point the hand-lever T is depressed, thus causing the jaws or levers V and W to press the male and female dies together upon the strip N, lying above and below the same, and to form upon the upper face of the strip a raised character corresponding to said dies. While the rock-shaft is being thus turned and before pressure begins to be applied to the dies, the arm 2 swings out of the path of feed-slide O, permitting it to move forward to whatever point is determined by the stop brought in front of its stop-arm *o;* but this movement does not take place until the dial-plate C is moved to its desired position, the arm 2 standing in the path of slide O until the lever T begins its downward movement, which it does not do until the appropriate character has been brought opposite the pointer E. As the lever T is depressed and just before the slide O is released by the arm 2 the arm 3 rides between two of the lugs *s* of the dial-plate and positions and locks said dial. As the lever continues its movement the rollers 6 and 7 ride upon the inclined or cam faces 8 and 9 of the levers V and W and force said levers toward each other and against the die-plates G and H; but before they apply pressure to the die-plates the slide O is released and allowed to advance its proper feeding distance, determined, as above stated, by the stop placed in its path through rotation of dial C and stop-disk S. The slide being arrested by the stop there will be no further feed of the strip, and consequently the lever T may be moved to further turn the rock-shaft R without liability of thereby moving the strip N. The rollers 6 and 7 are by the further movement of the lever T caused to ride further upon the inclined or cam faces 6 and 7 of levers V and W and to force said levers more nearly together, causing them to press the die-plates toward each other and to firmly clamp and press the strip between them at the point where the jaws bear. The pressure is such that the male die is forced into the metal and in turn presses the metal into the companion die, thereby producing the raised letter in the strip. After the jaws have been moved to the proper point the lever may continue its movement a short distance, but in so doing will ride over portions concentric with the axis of motion, and consequently will apply no further pressure to or through the jaws. Having been moved its full distance, it will be arrested by the arm 3 or other stop, if not by the hand of the operator, and will be moved or allowed to swing back to its initial position, and this operation is performed for each letter or character in turn. To space between words, letters, or characters, the same operation is performed, except that the word "Space" is brought opposite the pointer or indicator E.

When the full complement of characters is produced, the dial is turned to bring the word "Finish" opposite the pointer or indicator E and the lever T is again depressed. The turning of the dial to the point indicated brings beneath the overhanging end of jaw V the cut-off die 11, so that depression of said die through the depression of hand-lever T and rocking of shaft R will force said die downward upon and through the strip N, cutting out the portion necessary to give finish to the final end of the completed plate and to give like form to the end of the next succeeding plate. At such time lever W is thrown up and made to support the lower die, as above explained. The forked or U-shaped end 12 of the lower lever permits the piece removed from the strip to fall freely downward, and thereby avoids danger of clogging or of locking up the machine. As the die 11 descends its pin 13 strikes the inclined face 19 of the depending arm of rock-shaft 18 and rocking said shaft about its axis swings outward the arm 17 and withdraws its hook 16 from beneath the latch X, permitting the latter to fall and stand in the path of the feed-slide O, thereby preventing a further actuation of the machine until through the introduction and deposit of a proper coin the latch is again thrown up and locked.

Should the user attempt to produce an unauthorized number of characters or endeavor to feed out the strip, printed or unprinted, to an undue length, the advancing end of the strip will encounter the inclined plate 20 of the second depending arm of the rock-shaft 18 and release the latch in the manner already explained, thus locking the machine against further feeding or operation.

The name-plate or prepared strip when finished falls upon a proper guide board or chute and is delivered out of the machine at a point which precludes the introduction of implements with which to improperly manipulate the locking devices or any part of the machine.

In Fig. 1 stop-screws q are shown in regular order or succession, and these may be employed throughout the circumference of the stop-plate, or practically so. We find this unnecessary, however, and, in fact, undesirable, because most of the letters require like spacing. It is sufficient, therefore, to provide the stop-screws for those letters which require less spacing to permit the periphery of the disk to serve as the stop for those requiring the normal or more general width of spacing and to make depressions, if need be, for the few letters which require exceptionally wide spacing.

In the foregoing description it was intimated that the spacing at the finish might need to be greater than that for letters or characters, and this may be desirable under some circumstances. With the machine constructed and proportioned as represented in the accompanying drawings, however, the distance between the punch or cut-off device and the point at which the embossing is performed is sufficient to give the proper length of strip beyond the last character formed.

Having thus described our invention, we claim—

1. In a die-press, the combination of a dial-plate provided with a series of slots or recesses; die-carriers connected to and movable with said dial-plate; levers arranged to act simultaneously upon the two die-carriers and to move them toward each other; and a rock-shaft provided with studs or projections to act upon said levers and move them toward each other, and also provided with an arm to enter the slots or recesses of the dial-plate and hold the same against movement during the approach of the die-carriers.

2. In a die-press, the combination of a movable dial-plate C, provided with lugs s and intermediate slots or recesses; die-plates G and H connected to and movable with said dial-plate; clamping-jaws V and W adapted to act upon and press toward each other the dies carried by the plates G and H; and a rock-shaft provided with an arm 3 to enter the spaces between the lugs s, and with a cross head or arm 4 having projections to bear upon and force together the levers V and W.

3. In a die-press, the combination of a flexible plate provided with male dies; a second flexible plate provided with corresponding female dies, said plates being secured to a rotatable head in fixed relation to each other; levers fixed with reference to the movement of rotation of the die-plates and extending on opposite sides of said plates; and a rock-shaft provided with studs or arms adapted, when the shaft is rocked, to bear upon said levers and force them toward each other and thereby to press together the portions of the die-plates lying between said levers.

4. In a die-press, the combination of a rotatable head; two flexible die-plates carried by said head and slitted from their peripheries inward, the opposing tongues or portions of said plates provided respectively with male and female dies; levers extending on opposite sides of the die-plates; and a rock-shaft provided with studs or projections which, when the shaft is rocked, bear upon said levers and force them toward each other and cause them to press together the die-carriers lying between them.

5. In a die-press, the combination of a rotatable head; two die-plates carried thereby and provided respectively with male and female dies; levers extending on opposite sides of the peripheral portions of the die-plates and serving to press them toward a common medial plane; and a rock-shaft provided with studs or arms which, when the shaft is rocked, act upon said levers and serve to move them and with them the die-plates, toward each other.

6. In a die-press, the combination of an indicator-dial; a pointer or indicator in proximity to said dial; a spindle to which the dial is secured; flexible die-plates carried by said spindle and adapted to be simultaneously flexed and moved toward and from each other, whereby perfect registration of the dies may be secured notwithstanding the flexion of the plates; and means, substantially such as described, for acting upon said die-plates and moving them simultaneously and equally face-wise toward each other.

7. In a die-press, the combination of an indicator-dial provided with characters to indicate the position of dies; a pointer or indicator in proximity to said dial; a spindle to which the dial is secured; die-plates secured to said spindle; jaws between which the die-plates move, provided with cam-faces; a rock-shaft provided with a hand-lever for turning or rocking the same; a cross-head or block carried by said rock-shaft; and projections from said cross-head, extending outward therefrom and arranged to bear against and move toward each other the jaws or levers.

8. In combination with a suitable cabinet or casing provided with a top plate or cover; a dial-plate C above said top-plate; a spindle F secured to said dial and extending through the top plate; die-plates G and H carried by said spindle and provided respectively with female and male dies; jaws V and W, respectively above and below said die-plates; rock-shaft R provided with lever T; and rollers 6 and 7 carried by said rock-shaft and adapted to force together the levers V and W, substantially as described.

9. In combination with rotatable die-plates G and H provided respectively with male and female dies, cut-off die 11 and corresponding female die, carried respectively by the upper and lower die-plates; levers V and W, provided respectively with extensions 10 and 12; and means substantially such as described, for forcing said levers toward each other.

10. In a die-press, the combination with strip-feeding devices, and with a latch or lock to hold said feeding devices out of action, die-carriers movable past a fixed impression-point; a finishing-die carried by said die-carriers and provided with a projection; means for forcing said die against and through material interposed between the die-carriers; a rock-shaft provided with a detent to engage and hold out of locking position the feed locking stop or latch; and an arm or incline carried by the rock-shaft and located in the path of the projection of the finishing-die, whereby the rock-shaft is turned and the detent is swung to position to release the locking stop or latch when the finishing-die is actuated.

11. In a die-press, the combination with a dial and indicator, and with die-carriers connected to and movable with said dial, a finishing-die carried by said carriers and provided with a pin or projection; feed-rollers J and K for advancing a strip of material between the die-plates; a ratchet-wheel carried by the shaft or axle of one of said feed-rollers; a feed-slide O; a dog or pawl carried by said slide and adapted to engage with said ratchet-wheel; a latch X movable into and out of the path of the feed-slide; a rock-shaft 18 provided with an arm 17, having a hook or detent 16 to engage and hold said latch or stop out of the path of the feed-slide; and an incline 19 carried by said rock-shaft and located in the path of the projection of the finishing-die, whereby the rock-shaft is turned and its detent caused to disengage the latch when the finishing-die is actuated.

12. In a die-press, the combination of die-carriers provided with character-producing dies, and with a finishing or cut-off die, movable respectively past a fixed impression-point and a fixed finishing-point, the finishing-die being provided with a point or projection; means for forcing said dies together; a feed slide or bar adapted to actuate the strip-feeding mechanism; a latch movable into and out of the path of said feed-slide; and a rock-shaft provided with a detent to hold the latch out of locking position, said rock-shaft being provided with two arms having inclined faces, one in the path of the pin or projection of the finishing-die and the other directly in front of the advancing strip operated upon, whereby upon the depression of the finishing-die or upon the undue travel or advance of the strip the rock-shaft is turned to move the detent away from the latch and thus to release the latch and permit it to lock the feed-slide out of action.

13. In combination with dial-plate C and indicator E, die-carriers connected and movable with the dial-plate; male and female dies and finishing-dies carried by said die-carriers; means for pressing the dies together; feed devices; a feed-slide O for actuating said feed devices; a latch X movable into and out of the path of the feed-slide; a rock-shaft 18 provided with arm 17, having hook or detent 16; and depending arms provided with inclines 19 and 20, the former located in the path of the projection carried by the finishing-die and the latter in the path of advance of the strip operated upon.

14. In a die-press, the combination of die-carriers provided with dies movable toward and from each other; jaws V and W for forcing said dies together; rock-shaft R provided with cross-head 4, having lateral studs or projections 5, 5; rollers 6 and 7 carried by said cross-head; and a hand-lever for rocking said shaft, the jaws V and W being provided with cam-faces 8 and 9 and with portions concentric with the axis of the rock-shaft when the jaws are forced together, substantially as and for the purpose set forth.

15. In a die-press, the combination with dial-plate C, and with stop-plate S having a series of stops of varying projection from the axis of rotation; a feed-slide O provided with projection $o$ to engage the stops of the stop-plate S; feed-rolls for advancing material to be operated upon; a ratchet-wheel carried by the axle of one of said feed-rolls; and a pawl or dog carried by the feed-slide and adapted to engage with and rotate said ratchet-wheel, substantially as set forth.

16. The combination of a longitudinally-movable feed-slide, a spring for moving said slide in one direction; a cam or lever for moving the slide in the opposite direction; a feed-roller; a ratchet-wheel carried by the shaft of the feed-roller; a dog or pawl carried by the feed-slide and serving to rotate the ratchet-wheel and feed-roller; a latch or lock movable into and out of the path of the feed-slide; and a detent to engage and hold said latch when moved out of the path of said slide, substantially as set forth.

17. In combination with feed devices $i$, J, K, $k$, longitudinally-movable feed-slide O; spring P serving to move said slide in one direction; a cam or lever serving to move the slide in the reverse direction; lock or latch X movable into and out of the path of the feed-slide; and a detent 16 adapted to engage and hold the latch when the latter is moved out of the path of the feed-slide, substantially as set forth.

18. In combination with feeding devices and with an actuating-slide O therefor, latch X; carrier Y provided with arm $x$; slide Z adapted to act upon the actuating-arm $x$ and to move the carrier; and a rock-shaft 18 provided with arm 17, having hook or detent 16 to engage and hold out of action latch X.

19. In combination with feeding devices and with an actuating-slide O therefor, latch X; carrier Y provided with arm $x$; slide Z adapted to act upon the actuating-arm $x$ and to move the carrier; and a rock-shaft 18 provided with arm 17, having hook or detent 16 to engage and hold out of action latch X, and provided with inclines 19 and 20.

In testimony whereof we have signed our names to this specification in the presence of two subscribing witnesses.

ALFRED W. ROOVERS.
ALEXANDER H. ROOVERS.

Witnesses:
  REMSEN RUSHMORE,
  JACOB G. PREGENSER.